UNITED STATES PATENT OFFICE.

FERDINAND SCHUMACHER, OF AKRON, OHIO.

IMPROVEMENT IN PROCESSES OF PREPARING CEREAL GRAIN.

Specification forming part of Letters Patent No. 180,654, dated August 1, 1876; application filed May 1, 1876.

*To all whom it may concern:*

Be it known that I, FERDINAND SCHUMACHER, of Akron, in the county of Summit and State of Ohio, have invented certain new and useful Improvements in Prepared Cereal Grain; and I do hereby declare that the following is a full, clear, and exact description thereof, which will enable others skilled in the art to which it appertains to make and use the same.

My invention relates to grains, such as wheat, barley, &c., of human use, and has as its object a product so prepared and provided as will be not only palatable and nutritious, of easy and facilitated cooking, but also capable of being preserved and securely kept through varying climates and lengthened times.

Various processes have been employed for the purpose of bringing into agreeable and hygienic use so valuable a grain as barley, seventy per centum of which is starch. It has been steamed and dried to soften the integument prior to hulling, and, finally, it has been turned out as "pearled." Wheat has been pearled, cracked, and crushed; but all of the foregoing have failed to so apply heat to the naked kernel of the grain, as hulled, and just prior to its subjection between crushing-rollers.

The result has been that large quantities of prepared grain have been held on consignment as damaged and spoiled, directly attributable to the active breeding, from the undestroyed germ, of the black weevil—a little bug which, left to itself, works as a pest and destruction.

With such premise in view, my invention consists in the process of preparing a cracked, cut, or crushed, kiln-dried, pearled cereal, especially wheat and barley, same being capable of preservation under any temperature, when kept from light and air.

My process, more in detail, is of the following steps and measures: The edible grain, such as wheat or barley, is first pearled, according to the method well known in the art, and is then exhaustively treated to a high degree of temperature. This latter may be applied according to any desired manner and means; and while I do not in any wise limit myself to the herein-described apparatus, yet, for greater clearness, I give one mechanical means which I have found very adequate for the purpose. Said mode of drying the pearled grain preparatory to crushing is accomplished on a brick furnace, arched, with proper flues, and surrounded by a wall nine (9) feet, more or less, in diameter, and carried up high enough to leave an intermediate space of about one foot, more or less, thus forming a hot-air chamber, which is surmounted by a boiler-iron pan, in which latter the grain to an appropriate depth is constantly stirred, its agitation being insured and its burning guarded against by slowly-moving mechanism. The temperature is maintained far above the boiling-point by this means, and, at same time, smoke is prevented from coming in contact with the subject-matter. But any other structure and material means may be used in substitute of the above, as may be desired.

After such thorough heat treatment the grain will be immediately ready for introduction between any two smooth close-running rollers or other mechanical device, for completely mashing, cracking, or cutting the kernel of the grain.

Although I preferably use two smooth horizontal metallic rollers, moving at same speed of revolution, and close enough to thus mash, yet I do not hold same as necessary to my invention; but I may employ any varying or desirable apparatus capable of cracking, cutting, or crushing the kernel.

The resultant product, upon passage through this last process, is an article perfectly freed from the former-described inherent tendency to corruption, and, further, prepared for pleasant and healthful domestic consumption. It may be placed in appropriate packages, boxes, &c., sufficiently strong and dense to shield their contents from attacks of light and air, whereupon it is ready to be put upon the market.

Having fully described my invention, what I claim as new, and desire to secure by Letters Patent, is—

The process of preparing pearled wheat, barley, &c., for domestic use, the same consisting in kiln-drying the pearled grain, and, finally, crushing, cracking, or cutting the same, substantially as and for the purpose described.

In testimony that I claim the foregoing as my own I affix my signature in presence of two witnesses.

FERDINAND SCHUMACHER.

Witnesses:
A. F. HABICHT,
LOUIS SCHUMACHER.